No. 621,636. Patented Mar. 21, 1899.
F. DAVIS & O. H. P. CORNELIUS.
TOILET PAPER CASE.
(Application filed June 14, 1897.)
(No Model.) 6 Sheets—Sheet 1.
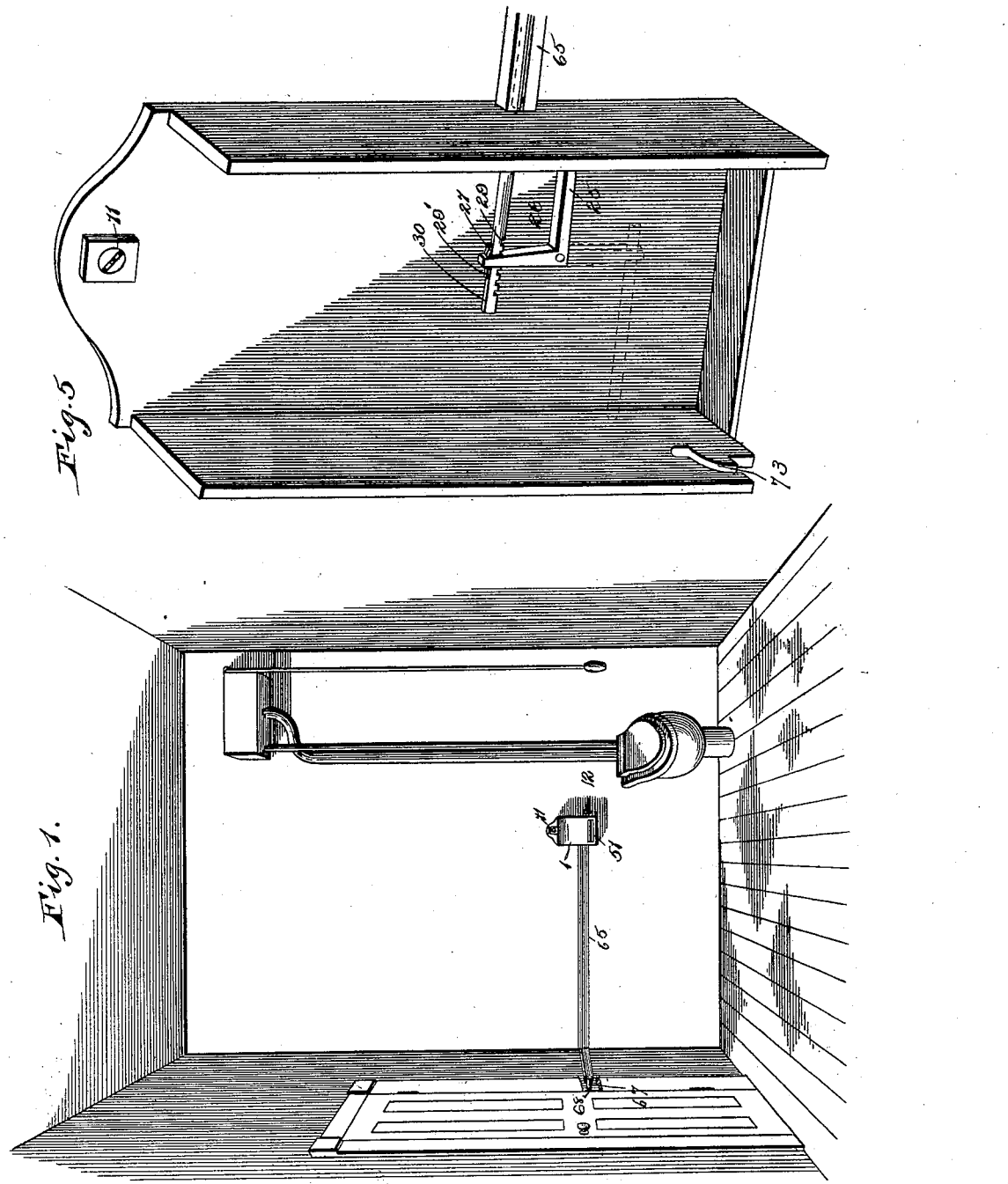
Witnesses
C. Bradway.
Victor J. Evans
Inventors
Frank Davis.
Oliver H. P. Cornelius.
by John Wedderburn
Attorney No. 621,636. Patented Mar. 21, 1899.
F. DAVIS & O. H. P. CORNELIUS.
TOILET PAPER CASE.
(Application filed June 14, 1897.)
(No Model.) 6 Sheets—Sheet 2.
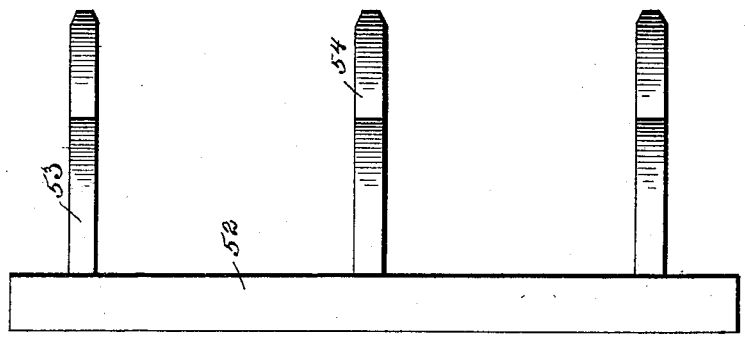
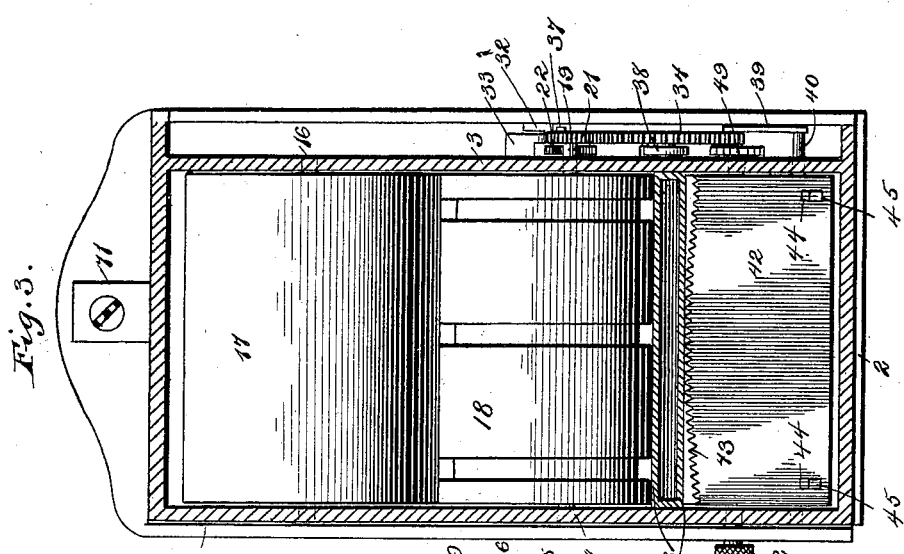
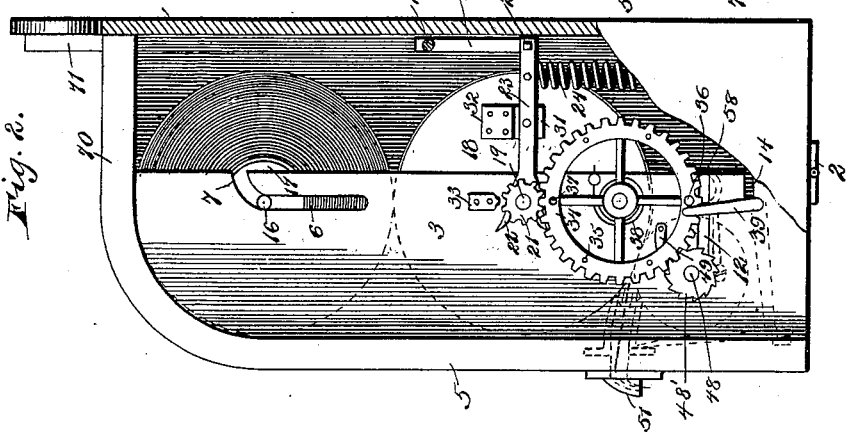
Witnesses
E. Bradway.
Victor J. Evans
Inventors
Frank Davis.
Oliver H. P. Cornelius.
by John Wedderburn
Attorney No. 621,636. Patented Mar. 21, 1899.
F. DAVIS & O. H. P. CORNELIUS.
TOILET PAPER CASE.
(Application filed June 14, 1897.)
(No Model.) 6 Sheets—Sheet 3.
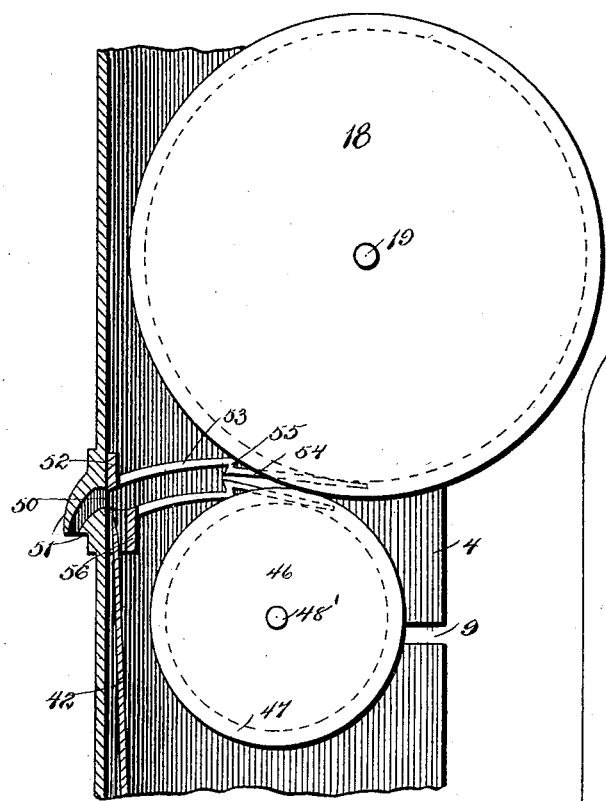
Fig. 3.
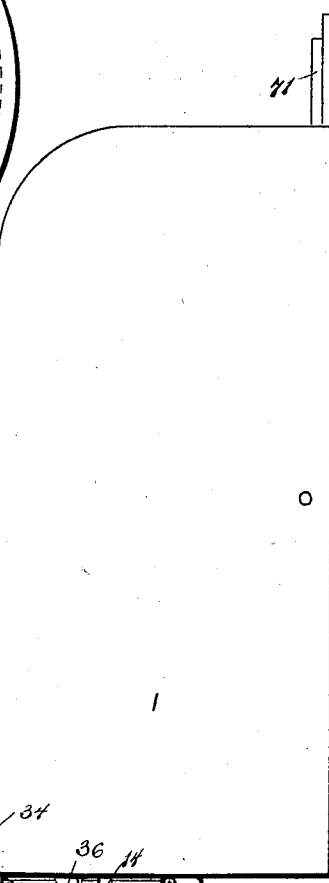
Fig. 4.
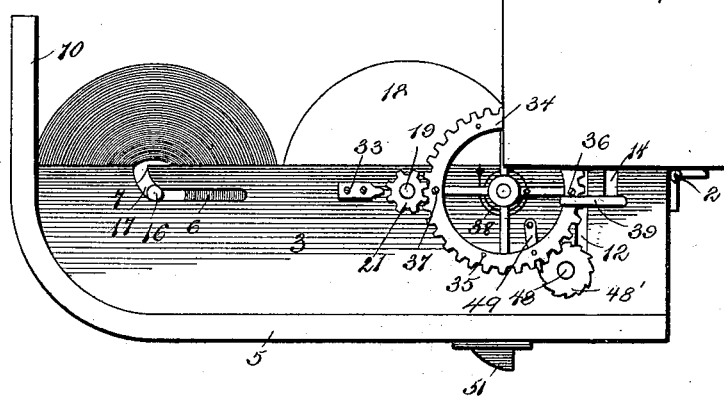
Witnesses
C. Bradway.
Victor J. Evans
Inventors
Frank Davis
Oliver H. P. Cornelius.
by John Wedderburn
Attorney No. 621,636. Patented Mar. 21, 1899.
F. DAVIS & O. H. P. CORNELIUS.
TOILET PAPER CASE.
(Application filed June 14, 1897.)

(No Model.) 6 Sheets—Sheet 4.

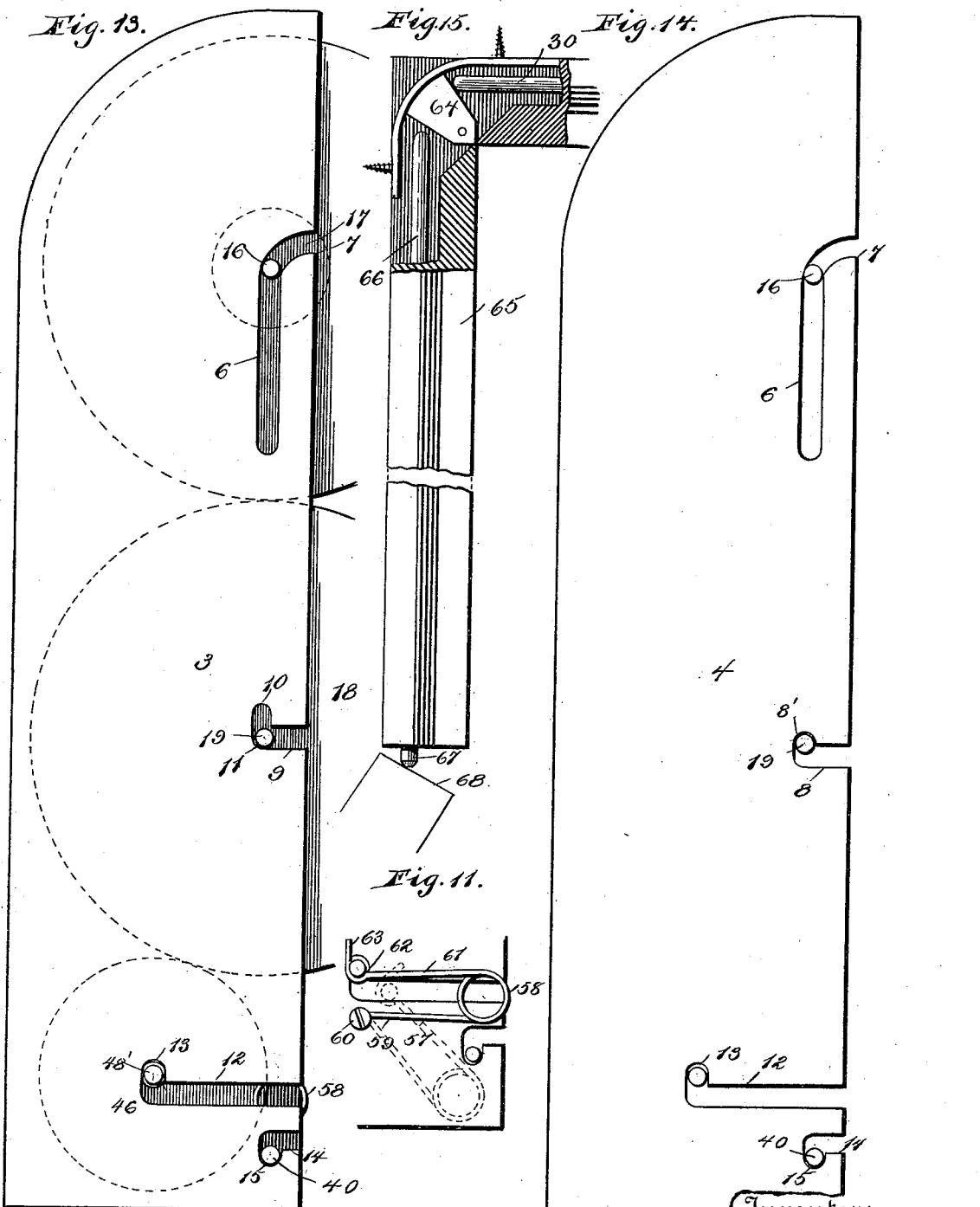

No. 621,636. Patented Mar. 21, 1899.
F. DAVIS & O. H. P. CORNELIUS.
TOILET PAPER CASE.
(Application filed June 14, 1897.)
(No Model.) 6 Sheets—Sheet 6.
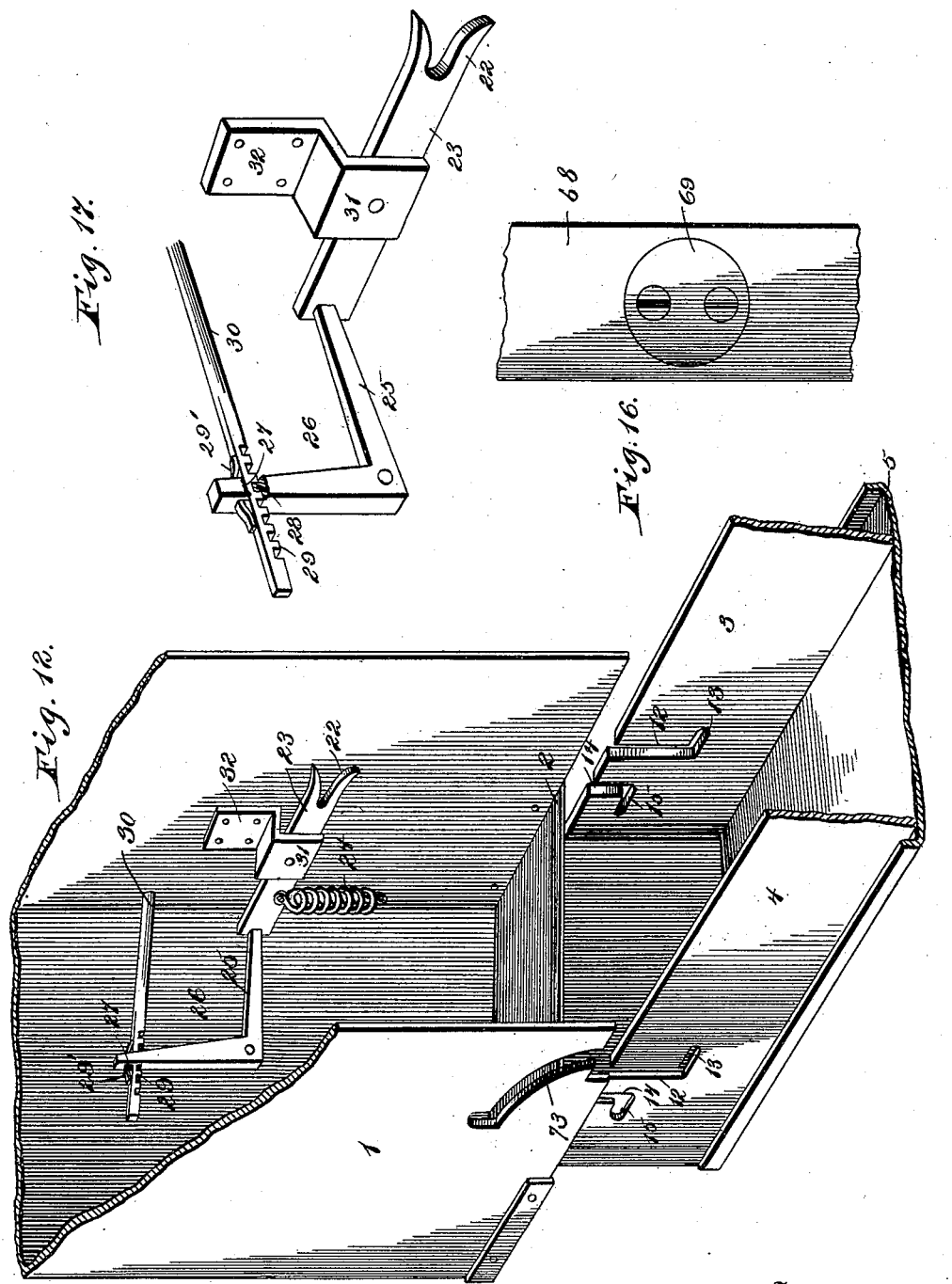

UNITED STATES PATENT OFFICE.

FRANK DAVIS AND OLIVER H. P. CORNELIUS, OF TURNER, OREGON; SAID CORNELIUS ASSIGNOR TO SILAS W. READ, OF SAME PLACE.

TOILET-PAPER CASE.

SPECIFICATION forming part of Letters Patent No. 621,636, dated March 21, 1899.

Application filed June 14, 1897. Serial No. 640,711. (No model.)

*To all whom it may concern:*

Be it known that we, FRANK DAVIS and OLIVER H. P. CORNELIUS, of Turner, in the county of Marion and State of Oregon, have invented certain new and useful Improvements in Toilet-Paper Cases; and we do hereby declare the following to be a full, clear, and exact description of the invention, such as will enable others skilled in the art to which it appertains to make and use the same.

This invention relates to automatically-operating toilet-paper cases or receptacles; and it consists, essentially, of feed mechanism therein which is controlled by the movement of a door to an apartment in which the device may be situated to unlock and lock the operating devices in said cases or receptacles.

The invention further consists of the details of construction and arrangement of the several parts, which will be more fully hereinafter described and claimed.

Heretofore in devices of this character the paper has been easily obtained and invariably improperly used, or if locking means were provided the case or receptacle was of such nature that it could be readily tampered with and the locking mechanism released and therefore proved of little value.

The object of the present invention is to provide automatically-operated mechanism which will absolutely prevent the withdrawal of paper from a case or receptacle until concealed mechanism actuated by the operation of a door has been set in motion and then only a predetermined quantity.

Figure 9:
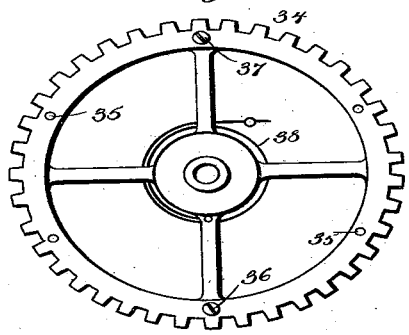
Figure 10:
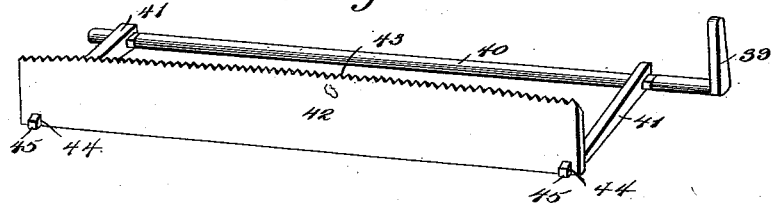
Figure 7:
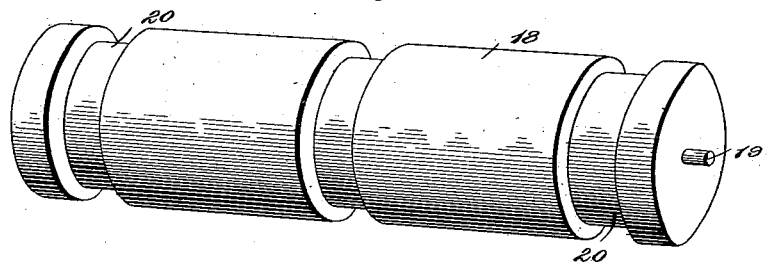

In the accompanying drawings, Figure 1 is a perspective view of a portion of an apartment, showing the improved toilet-paper case set up in operative position. Fig. 2 is a side elevation of the improved case, showing a part of the case removed. Fig. 3 is a front elevation of the case and showing the front part thereof detached. Fig. 4 is a side elevation of the two parts of the case in open position. Fig. 5 is a front perspective view of the rear part of the case. Fig. 6 is a detail plan view of a portion of the paper-guide. Fig. 7 is a detail perspective view of one of the rolls. Fig. 8 is a sectional elevation of a part of the coacting rolls and the feed-guide. Fig. 9 is an end elevation, on an enlarged scale, of the regulator. Fig. 10 is a detail perspective view of the paper-severing device. Fig. 11 is a detail view of part of the operating mechanism. Fig. 12 is a detail perspective view of a portion of the case, showing the construction thereof. Figs. 13 and 14 are side elevations, on enlarged scales, of the opposite sides of a portion of the case. Fig. 15 is a sectional plan view of the operating mechanism actuated by movement of a door. Fig. 16 is an end elevation of a portion of a door-frame, showing a bearing-plate thereon. Fig. 17 is a detail perspective view of part of the actuating mechanism in direct connection with the operating-rod leading to the door.

Referring to the drawings, wherein similar numerals of reference are employed to indicate corresponding parts in the several views, the numeral 1 designates a main case consisting of two parts hinged at 2, so that the front portion will fall down from the rear part, which remains stationary. The back, sides, and bottom of the rear section are made of one piece of sheet metal, the sides extending the full depth of the case and the bottom having a length of less than half the depth, and to which the front section is secured by hinges, as heretofore stated. The outer portion of the front section of the case is also constructed of one piece of sheet metal, to which the sides 3 and 4 are secured by turning the edges of the said outer portion inward at a right angle, as at 5, forming lips which when the case is closed will be over the front edges of the rear section.

In closing the case the sides 3 and 4, carrying mechanisms which will be hereinafter more fully referred to, are thereby partially inclosed by the rear section and all the devices assembled in operative position, as clearly shown by Figs. 13 and 14, as well as in the preceding figures, on a smaller scale. The sides 3 and 4 of the outer section are formed with upper slots 6, which have curved outlets 7 extending through the rear edges of the said sides. Below the slot 6 in the side 3 a short horizontal slot 8 opens out through the rear edge and has an upper upright extension 8' at its forward termination. In like manner the side 4 has a horizontal slot 9 extending from the rear edge thereof and having at its forward end a vertical extension 10, and the lower wall of the slot directly under the said extension is curved, as at 11. Nearer the bottom of the said sides 3 and 4 are horizontally-disposed outwardly-extending slots 12, having vertical extensions 13 situated above the plane of the main portion of each slot 12, and below the said slots 12 are smaller horizontal slots 14, with curved extensions 15 below the plane of the greater portion of said slots 14. When the sides 3 and 4 are arranged in position for receiving the several mechanisms, the slots 6, 12, and 14 are in alinement and the curved part 11 of the slot 9 stands in line with the curved extension 8' of the slot 8. Within the slot 6 are removably mounted the trunnions 16 of a paper-roll 17, which may be removed by elevating the said trunnions and carrying them through the curved entrance 7. In like manner the said trunnions are applied to the sides and automatically gravitate in the vertical slots 6 as the paper is unwound from the roll and the size of the latter decreased.

Below the roll 17 a tension-roll 18 is mounted and has trunnions 19, which bear in the upturned extensions of the slots 8 and 9 and which serve to hold the said roll in properly-adjusted position and against accidental disengagement. In pulling out the said roll it is depressed until the trunnions are brought down into the horizontal portions of the slots 8 and 9, when the roller can be readily withdrawn. The said roller 18, as clearly shown in Fig. 7, has a series of grooves 20 arranged at regular intervals therein, and in connection with one of the trunnions 19, which is extended, is a pinion 21, (clearly shown in Figs. 2, 3, and 4,) and embracing the same, inside of the said pinion, is a yoke end 22 of a lever 23, having a spring 24 attached thereto and an adjacent portion of the rear section of one side of the case, and to the rear end of the said lever is secured the lower arm 25 of a bell-crank lever 26, having its opposite vertically-disposed arm slotted at the upper end, as at 27, and provided with a tooth 28, engaging rack-teeth 29 of a bar or rod 30, which will be hereinafter more fully referred to. To sustain an engagement of the teeth 29 with the tooth 28 in the slotted end of the vertical member of the bell-crank lever 26, a spring 29' is inserted between the parts, as clearly shown in Fig. 17. By pressing the rod 30 upward, overcoming the tension of the spring 29', said rod can be moved longitudinally relative to the tooth 28 on the lever 26 for giving the parts the proper operative relation to the door. The lever 23 is fulcrumed against the inner side of an angular bent end 31 of a bracket 32, secured on the inner part of one side of the rear section of the case, and operates to adjust the pinion 21 for throwing it into engagement with a regulator-gear, hereinafter referred to, overcoming the tension exerted by the spring 24. Above the lever 23 is a stop 33, which is adapted to engage the teeth of pinion 21 to prevent rotation of the tension-roll while the door is being opened or opened and closed. Below the pinion 21 is a regulator consisting of a gear 34, having a series of screw-threaded openings 35 therein and adjustable screw-posts 36 and 37. The said gear 34 is spring-controlled by having a coiled spring 38 attached thereto and to an adjacent portion of one end of the inner section of the case, as more clearly shown in Fig. 9. The openings 35 in the gear 34 are for the purpose of regulating the quantity of paper withdrawn from the case, the said various openings being spaced apart relatively to the operating mechanism.

Below the regulator just described is an upwardly-projecting right-angle extension 39 of a cutter-shaft 40, having a pair of arms 41 immovably secured thereto and extending forwardly therefrom, and at their outer ends is a cutter 42, formed with an upper serrated edge 43. The said cutter 42 has openings 44, formed therein adjacent to the outer ends thereof, and extending therethrough are the reduced shouldered ends 45 of the said arms 41, which are upset at an angle against the lower edge of the said cutter to hold the same in fixed position, as clearly shown in Fig. 10. The said cutter 42 is arranged at a slight angle of inclination, so that its serrated edge may be brought properly against the paper to be severed, and when the parts are set for operation the adjustable screw-post 36 normally bears against the rear upper portion of the angular extension 39 of the shaft 40, thereby holding the said cutter down until the gear 34 of the regulator is revolved and the post 37 strikes the opposite side of the upper part of the extension 39, when a tilting operation of the shaft 40 will take place and throw the cutter upwardly to sever the paper. The shaft 40 extends a suitable distance beyond the arms 41 and is seated in the lower curved extensions 15 of the horizontal slots 14 in the sides 3 and 4 and is removable, as will be readily understood. Below the regulator and inside of the cutter is a feed-roll 46, (clearly shown in Fig. 7,) having grooves 47 therein corresponding to and alining with the grooves 20 in the tension-roll 18. This feed-roll is smaller than the tension-roll 18 and is provided with trunnions 48, bearing in the vertical extensions 13 of the horizontal slots 12 and removable through the said slots, and on the outer end of one of the trunnions adjacent to the regulator is secured a ratchet-wheel 48, which is engaged by a pawl 49 to prevent the said feed-roll from having backward movement. The feed-roll 46 holds the paper against the tension-roll 18 and prevents the latter from drawing slack and resists any tendency toward an inward movement of the paper. When the door of the apartment in which the device is situated is closed, the adjustment of the several parts must be such that the pinion 21 will be in full mesh with the gear 34 and free from the stop 33, and when the door is open the cogs of pinion 21 must be in full mesh with the stop 33, and consequently free from cogs or teeth of gear 34. The cogs of pinion 21 and gear 34 are of such length and the stop 33 so adjusted that at no time will the teeth of pinion 21 be free from the one before they engage the other. This prevents the paper being drawn out continuously without operating the gear 34. To prevent the lever 23 from flying upward at too great an elevation when the case of the machine is open, the yoked end of the lever being free at this time from the trunnion of the roll 18, it is so hung in the bracket 32 that its top edge will come in contact with said bracket and stop its upward movement.

As clearly shown in Fig. 8, the outer face of the case is provided with a feed-slot 50, which is guarded by depending lips 51, extending downwardly a sufficient distance to prevent the insertion of any implement with the purpose to tamper with or start the mechanism. Over the feed-slot 50 is secured a vertical flange 52 of a paper-guide 53, which extends inwardly from the lower edge of said flange at an upward curve, and projecting therefrom are fenders 54, which are connected to the said guide by necks 55. The said necks are narrower than the fenders and arranged at a return-angle to prevent the ragged end of the paper from doubling under the fenders and catching in the angles when filling the machine. This construction is duplicated in connection with the lower part of the feed-slot 50, with the exception that a flange 56 depends away from the adjacent face of the case to permit the movement of the cutter 42 upwardly between the same and the said adjacent portion of the case directly under the paper, the guide in this instance being secured at its opposite ends and held thereby in rigid position. The angles of the necks 55 are also reversed in the lower guide, and the fenders in each instance extend into the grooves 20 and 47 in the tension-roll 18 and feed-roll 46 and strip or loosen the paper from the said rolls should it adhere thereto. The grooves in the said rolls are very shallow, and any number may be used as desired and found necessary.

It is preferable to have the roll 18 twelve inches in circumference, as it will then issue one foot of paper at each revolution, and to prevent the paper from slipping on its surface it is coated with a granular substance. Also the cutter 42 is slightly higher at the center than at the ends, and the teeth therein are ground to a point by sharpening the edge of the said cutter, as fully shown. By having the cutter higher in the center than at the ends it causes the paper to be cut from the center each way. The journals of the roller 46 are retained in position by springs 57, as shown in Fig. 11, which have coils 58 at their bends and one arm 59, secured by a screw 60 to the end of the case below the slot 12. The other arm 61 in each of the springs has a curved seat 62 adjacent to the inner end, which is formed by bending a portion of the said arm upwardly in a vertical plane, as at 63. The journal or trunnion of the said roll 46 on each side rests in the said seat 62, and the said roll is held against the roll 18 by the said springs with a slight yielding movement or cushioning engagement. In removing the said roll 46 the springs 57 are pressed downwardly, as shown in dotted lines in Fig. 11, so as to bring the seats 62 in line with the horizontal slots 12, when the journals or trunnions of the said roll 46 can be readily removed, and in this operation the arm 59 turns on the screw 60, the coils 58 of springs 57 coming in contact with the bottom of the case, thus checking any further movement of said springs. In replacing the roll the journals or trunnions thereof are moved inwardly in the slots 12 and, striking the seats 62, shove the said parts of the spring outward and simultaneously raise the same to the horizontal position shown in full lines and force the journals or trunnions upwardly into the vertical extensions 13.

The rod or bar 30 is extended a suitable distance from the side of the case and connects with an angle-switch 64, inclosed within a conduit or case 65. Secured to the opposite side of the angle-switch another rod 66 is attached and continues therefrom any suitable distance and has a projecting end 67 adjacent to the inner edge of a door 68, which is shown in Figs. 1 and 15. On the edge of the door with which the projecting end 67 of the rod 66 engages a bearing-plate 69 is mounted, as clearly shown in Fig. 16. The outer section of the case is formed with a projecting end 70 at its free end, which passes over and coacts with a lock 71 at the top portion of the rear section of the case to thereby secure the two sections of the case in closed position and simultaneously shield the operating mechanism from exterior contact through the formation of the parts of the case as heretofore set forth.

In assembling the parts heretofore described the cutter 42 is first mounted in the case with the shaft 40 thereof in the slots 14 and the angular projection 39 exposed at one side for engagement with the operating mechanism. The roll 46 is next mounted in position by having the journals or trunnions thereof engage the springs 59. The cutter 42 is not fully inserted until after the roll 46 has been properly seated and the springs 59 raised, as shown in full lines in Fig. 11. After the said roll 46 is thus secured in operative position the cutter 42 is then fully inserted in the outer portion of the case. The roll 18 is then placed in the outer portion of the case above the roll 46, and, lastly, the paper-roll 17, and the paper is pulled down from the said roll to the rear side and over the roll 18 and then forward between the rolls 46 and 18 sufficiently to cause a feeding action of the said paper when the machine is operated. The entire device is secured by screws to the wall of an apartment in which it is placed, and in assembling or disarranging the removable parts the front portion or section of the case is held down, when the paper-rolls and other mechanisms can be conveniently reached, and in arranging the paper, as specified, for feeding the operation is assisted by a turn-button 72, attached to one journal of the roller 46 and located exteriorly of the case for easy engagement, said journal extending through a curved slot 73 in the outer casing, which permits the necessary movements of the journal when the hinged inner casing is swung into or out of operative position.

The operation of the device is as follows: On entering the door of the apartment the edge 68 of the door having the bearing-plate 69 therein and which normally presses against said projecting end of the rod releases the latter and the spring 24, attached to the lever 23 in rear of the fulcrum of the latter, throws the said lever downwardly at the rear end, together with the lower arm 25 of the bell-crank lever 26, and the outer yoked end 22 of the said lever 23 rises, carrying the gear 21 with it up into engagement with the stop 33 and simultaneously slightly elevating the end of the roll 18, carrying said gear. After the door has been opened and the parts operated which lift the roll 18 it is obvious that the spring 38 acts to turn back the gear 34 and reset the feed mechanism. The gear 21 connects the mechanism, as will be understood, and when the door is closed again the lever 23 is again moved downwardly against the tension of the spring 24, carrying the gear 21 therewith and placing it in mesh with the gear 34 of the regulating device. Then by turning the button 72 the paper is fed out of the mouth of the machine until the adjustable screw-post 37 in the gear 34 is brought around and strikes the outer edge of an angular projection 39 of cutter-shaft 40, when the cutter will be thrown up and sever the paper. After having delivered a predetermined quantity thereof the cutting operation ensues and no more paper can be taken from the machine until the door is again opened and closed. The regulating mechanism is checked in its backward movement by the screw post or seat 36 coming in contact with the rear of the angular projection 39 of the cutter-shaft 40, and the pressure of the screw-post 37 having been removed from the said angular projecting end or extension 39 the cutter drops by gravity out of operative position. On again opening and closing the door the same effect is produced as above. Any momentum of the rolls 18 and 46 is checked by the arms 41 of the cutter 43 coming in contact with the said roller 46 and at the same time arresting the upward movement of the said cutter before it reaches the upper guide of the feed-slot. After the paper is taken out the machine becomes locked, as it were, and by turning the button 72 the roll 46 will slip on the paper, for the reason that the gears 21 and 34 are in contact and turned to their full adjustment. The roll 46 cannot be turned backwardly through the intervention of the ratchet 48 and the pawl 49; neither can any paper be taken from the machine while the door is being opened or after it is opened, this being obviated by the locking-stop 33, which engages the pinion 21, it being understood that when the door is opened the gear 21 is lifted out of mesh with the gear 34 and allows the spring to reset the regulator-gear 34, after which no operation of the several parts can be had until the door is again closed, thereby bringing the lever 23 downwardly by a mechanism heretofore set forth to cause an engagement of the gears 21 and 34.

To set the machine so that it will deliver any amount of paper desired—say from one to six feet—it is only necessary to change the position of the screw-post 37 from one hole 35 to another, the said holes being arranged to deliver from one to six feet of paper, or the amount may be varied by changing the gear of the wheels 21 and 34. For all practical purposes, however, six feet should be the limit, and a smaller quantity should be sufficient if properly used. At the point where the rod 30 engages the arm of the bell-crank lever it is slightly flattened to insure a proper operation, and if a left-hand door is encountered, the device being shown arranged in connection with the right-hand door, it is only necessary to reverse the position of the bell-crank lever and bring the rod 30 in at the lower portion of the opposite side of the machine.

The device, as heretofore set forth, can be used in a large or small apartment having a door or other movable entrance means, or an analogous movable object might be used to lock and unlock the device, and a door is mentioned because it is a convenient form of application.

The device is especially applicable for use in hotels and in other large or public places, and it might be employed to deliver any kind of paper or other material, and the dimensions of the several parts could be readily changed to accommodate different kinds of work.

Having thus described the invention, what is claimed as new is—

1. A toilet-paper case comprising a paper-roll, a tension-roll, a regulating device, a cutter, and spring-actuated mechanism thrown into action by the movement of a door, for setting said parts for operation, substantially as described.

2. A toilet-paper case having paper-feeding mechanism therein, and connections between said mechanism and a door for causing the mechanism to be set for operation by the movement of the door, substantially as described.

3. A toilet-paper case having paper-feeding devices therein, and a spring-actuated regulator controlling said feeding devices adapted to be set for operation by the opening and closing of a door, substantially as described.

4. A toilet-paper case, comprising front and rear sections, the front section having a feed-opening and elongated slots in opposite sides thereof, a gravitating paper-roll removably mounted in said slots, an adjustable tension-roll and an independently-movable cutter, substantially as described.

5. A toilet-paper case having a feed-opening, a gravitating paper-roll, a tension-roll, a regulator geared to said tension-roll and an independent cutter actuated by said regulator, substantially as described.

6. A toilet-paper case having feed-opening, a gravitating paper-roll, a tension-roll, a regulator-gear therefor and a vibrating cutter operated by movable projections on said gear, substantially as described.

7. A toilet-paper case having a feed-opening and comprising a paper-roll, a tension-roll, a feed-roll, a vibrating cutter independent of said tension-roll, and an automatically-retracted regulator for actuating the cutter, substantially as described.

8. A toilet-paper case having a feed-opening and comprising an automatically-adjustable paper-roll, a tension-roll, a feed-roll, a regulator-gear for said feed-roll and a vibrating cutter actuated by said gear, substantially as described.

9. A toilet-paper case having a feed-opening and comprising paper-feeding mechanism, a regulator to control the quantity of paper delivered, and devices actuated by the movement of a door for setting said parts to operate substantially as described.

10. A toilet-paper case having a feed-opening and comprising a paper-roll, a tension-roll, and a spring-retracted feed-roll, said tension-roll being adapted to be automatically adjusted to and from the said feeding-roll by the opening and closing of a door, substantially as described.

11. A toilet-paper case having a tension-roll, and spring-actuated mechanism adapted by the movement of a door to automatically adjust said roll, substantially as described.

12. A toilet-paper case comprising paper-feeding mechanism, a cutter connected with a rock-shaft and having an angular projection in connection therewith, and a spring-actuated regulator having adjustable posts to engage said angular projection, substantially as described.

13. A toilet-paper case comprising paper-feeding mechanism, a cutter having an angular projection in connection therewith, a spring-actuated gear having posts adjustably carried thereby to engage said projection, and means for operating said gear, substantially as described.

14. A toilet-paper case comprising paper-feeding mechanism, a cutter mounted on arms on a rock-shaft having an angular extension, and a regulator-gear having projections to engage opposite sides of said extension, substantially as described.

15. A toilet-paper case comprising a paper-roll, a tension-roll having an actuating device in connection therewith, means for raising and lowering said tension-roll and its actuating device, a feed-roll, a cutter, and a regulating device to control said cutter and adapted to be engaged and operated by said actuating device, substantially as described.

16. A toilet-paper case comprising a paper-roll, a tension-roll having a pinion on one of its journals, a spring-actuated device engaging said tension-roll to raise and lower the same and the pinion carried thereby, a feed-roll, a cutter, and regulator consisting of a spring-actuated adjustable gear with projections to engage a part of said cutter and adapted to be engaged and operated by a pinion, substantially as described.

17. A toilet-paper case having a front section with slots in the lower part of opposite ends, pivoted springs mounted adjacent to and partially movable over said slots, a removable feed-roll supported by said springs, and relatively-coacting mechanism, substantially as described.

18. In a toilet-paper case, the combination of a paper-roll, an adjustable tension-roll, a feed-roll having yielding pivoted spring-supports, and a cutter, substantially as described.

19. In a toilet-paper case, the combination of a gravitating paper-roll, an adjustable tension-roll, carrying a pinion, a spring-actuated lever engaging said tension-roll and pinion, a feed-roll, a regulator consisting of a gear with adjustable projections, a cutter having an angular extension, and means interposed between said spring-actuated lever and a door for adapting the latter to overcome the tension of the spring for operating said lever, substantially as described.

20. In a toilet-paper case, the combination of a paper-roll, an adjustable tension-roll having a pinion in connection therewith, a yoked spring-actuated lever engaging the shaft of said tension-roll and pinion, a bell-crank lever movably attached to said spring-actuated lever and having a toothed arm, a toothed rod engaging said toothed arm, a second rod arranged at an angle to said toothed rod, an interposed angle-switch, said second rod having a free projecting end, a door with a bearing-plate to engage said free end of the second rod, a feed-roll, a cutter with an extension at one side, a regulator consisting of a spring-actuated gear having adjustable projections, and a stop for said yoked spring-actuated lever, substantially as described.

21. In a toilet-paper case, the combination of a paper-roll, an adjustable tension-roll having a pinion at one side thereof, means for adjusting said tension-roll and pinion, a feed-roll, a cutter secured to a rock-shaft having an angular extension at one end, and a regulator consisting of a spring-actuated gear with a series of screw-openings therein with posts adjustably mounted in a portion of the same and engaging said extension, substantially as described.

22. A toilet-paper case having a feed-slot and comprising a paper-roll, a grooved tension-roll, a grooved feed-roll, a cutter, and guides having fenders projecting therefrom into said grooved tension and feed rolls and provided with reduced angular necks, substantially as described.

In testimony whereof we have signed this specification in the presence of two subscribing witnesses.

FRANK DAVIS.
   OLIVER H. P. CORNELIUS.

Witnesses:
 H. W. SMITH,
 M. HOWE.